US009784935B2

(12) United States Patent
Bringuier et al.

(10) Patent No.: US 9,784,935 B2
(45) Date of Patent: Oct. 10, 2017

(54) COEXTRUDED JACKET FOR FLAME RETARDANT FIBER OPTIC CABLES

(71) Applicant: Corning Optical Communications LLC, Hickory, NC (US)

(72) Inventors: Anne Germaine Bringuier, Taylorsville, NC (US); Anna Lipiec, Lodz (PL); Allen Michael Miller, Lenoir, NC (US); Sebastian Olszewski, Aleksandrów Łódzki (PL); Katarzyna Synowiec, Borchówka (PL)

(73) Assignee: Corning Optical Communicaitons LLC, Hickory, NC (US)

( * ) Notice: Subject to any disclaimer, the term of this patent is extended or adjusted under 35 U.S.C. 154(b) by 0 days.

(21) Appl. No.: 15/339,993

(22) Filed: Nov. 1, 2016

(65) Prior Publication Data
US 2017/0153405 A1   Jun. 1, 2017

Related U.S. Application Data

(60) Provisional application No. 62/260,843, filed on Nov. 30, 2015.

(51) Int. Cl.
| | |
|---|---|
| *G02B 6/44* | (2006.01) |
| *B29D 11/00* | (2006.01) |
| *H01B 7/295* | (2006.01) |

(52) U.S. Cl.
CPC ...... *G02B 6/4436* (2013.01); *B29D 11/00663* (2013.01); *G02B 6/441* (2013.01);
(Continued)

(58) Field of Classification Search
None
See application file for complete search history.

(56) References Cited

U.S. PATENT DOCUMENTS 4,547,626 A * 10/1985 Pedersen ............... G02B 6/4416
174/107
5,173,960 A * 12/1992 Dickinson ............ G02B 6/4403
174/121 A
(Continued)

FOREIGN PATENT DOCUMENTS

| CN | 200986605 Y | 12/2007 |
|---|---|---|
| CN | 203689958 U | 7/2014 |

(Continued)

OTHER PUBLICATIONS

International Search Report and Written Opinion PCT/US2016/057611 Dated Mar. 10, 2017.

*Primary Examiner* — Mike Stahl
(74) *Attorney, Agent, or Firm* — William D. Doyle

(57) ABSTRACT

A fiber optic cable comprises a core subassembly comprising at least one optical fiber and a tube surrounding the optical fiber. A multi-layered jacket surrounds the core subassembly, wherein the jacket comprises an inner layer comprising a flame retardant (FR) material and an outer layer comprising a non flame retardant material having a lower coefficient of friction than the flame retardant material. A method of manufacturing an optical fiber cable includes providing a core subassembly and co-extruding a multi-layered jacket around the core subassembly, wherein the multi-layered jacket includes an inner layer comprising a flame retardant (FR) material and an outer layer comprising a non flame retardant material having a lower coefficient of friction than the flame retardant.

21 Claims, 3 Drawing Sheets

(52) U.S. Cl.
CPC ......... *G02B 6/4433* (2013.01); *G02B 6/4486* (2013.01); *G02B 6/4438* (2013.01); *H01B 7/295* (2013.01)

(56) References Cited

U.S. PATENT DOCUMENTS

| | | | | |
|---|---|---|---|---|
| 5,358,011 | A * | 10/1994 | Stockton | G02B 6/4459 138/103 |
| 6,249,628 | B1 * | 6/2001 | Rutterman | G02B 6/4495 385/100 |
| 2010/0255186 | A1 * | 10/2010 | Montes | H01B 13/24 427/117 |
| 2011/0135816 | A1 * | 6/2011 | Burns | B29C 47/0014 427/163.2 |
| 2013/0062097 | A1 * | 3/2013 | Hammond | B32B 1/08 174/120 SR |
| 2014/0241677 | A1 * | 8/2014 | Sutehall | G02B 6/4433 385/104 |
| 2015/0131952 | A1 * | 5/2015 | Gallo | G02B 6/4436 385/102 |
| 2015/0226928 | A1 * | 8/2015 | Ceschiat | G02B 6/4438 385/112 |

FOREIGN PATENT DOCUMENTS

| | | | |
|---|---|---|---|
| CN | 203746560 U | | 7/2014 |
| CN | 203910317 U | | 10/2014 |
| EP | 2346130 A2 | * | 7/2011 |
| JP | 2000-66072 A | * | 3/2000 |
| WO | 2014175229 A1 | | 10/2014 |
| WO | 2015142604 A1 | | 9/2015 |

\* cited by examiner

COEXTRUDED JACKET FOR FLAME RETARDANT FIBER OPTIC CABLES

CROSS-REFERENCE TO RELATED APPLICATIONS

This application claims the benefit of priority under 35 U.S.C. §119 to U.S. Provisional Application No. 62/260,843, filed on Nov. 30, 2015, and is incorporated herein by reference.

BACKGROUND

Aspects of the present disclosure relate generally to cables, such as fiber optic cables, that may support and carry optical fibers as well as other cable components.

Fiber optic cable, especially those in jurisdictions and applications with strict fire and smoke regulations, are designed to minimize the spread of fire, smoke, poisonous gases, and other hazards related to fire. Often thick jackets of flame-retardant (FR) and Low Smoke Zero Halogen (LSZH) materials are used to meet the demand for these types of fiber optic cables. However, these types of cables are often intended for installation into ducts that depends on an installation method whereby the cable is blown or jetted into the duct. Therefore, a cable jacket is needed that provides the benefits of FR and LSZH materials to pass international burn tests, such as IEC 60332-1-2 (single cable burn test), IEC 61034 (smoke density), and IEC 60332-3-24 (bunch cable burn test), and also have the strength and durability to withstand the stresses of installation, such as compression forces, impact and bending stresses, while providing a low coefficient of friction in order to provide the necessary blowing performance during installation.

LSZH materials utilize a high percentage of filler particles, such as magnesium hydroxide, aluminum hydroxide and other suitable materials, which result in a very low ultimate elongation of the material, especially at elevated temperatures. This low ultimate elongation of LSZH materials can lead to jacket cracking when cable products are subjected to typical handling and installation loads.

SUMMARY

Aspects of composite jacket materials are disclosed that provide the necessary FR/LSZH and installation characteristics through the synergy of a multilayer composition. Fire retardancy is provided by using a FR, or in particular a LSZH material, while the strength, increased ultimate elongation and low coefficient of friction is provided by a less flame retardant or non-FR compound such as polyethylene (PE). Increased adhesion between these two different type of materials may be accomplished by coextruding a double layer jacket during production of the cable. Coextrusion provides excellent bond strength between the layers of different compounds, reducing or eliminating wrinkling and/or separation of the outer layer during the installation process.

In accordance with aspects of the present disclosure, a fiber optic cable comprises a core subassembly comprising at least one optical fiber and a tube surrounding the optical fiber. A multi-layered jacket surrounds the core subassembly, wherein the jacket comprises an inner layer comprising a flame retardant (FR) material and an outer layer comprising a non flame retardant material having a lower coefficient of friction than the flame retardant material.

In accordance with other aspects of the present disclosure, a multi-layered cable jacket comprises an inner layer comprising a flame retardant (FR) material and an outer layer comprising a non flame retardant material having a lower coefficient of friction than the flame retardant material.

In accordance with yet other aspects of the present disclosure, a method of manufacturing an optical fiber cable includes providing a core subassembly and co-extruding a multi-layered jacket around the core subassembly, wherein the multi-layered jacket includes an inner layer comprising a flame retardant (FR) material and an outer layer comprising a non flame retardant material having a lower coefficient of friction than the flame retardant material.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures and/or described elsewhere in the text.

Figure 1:
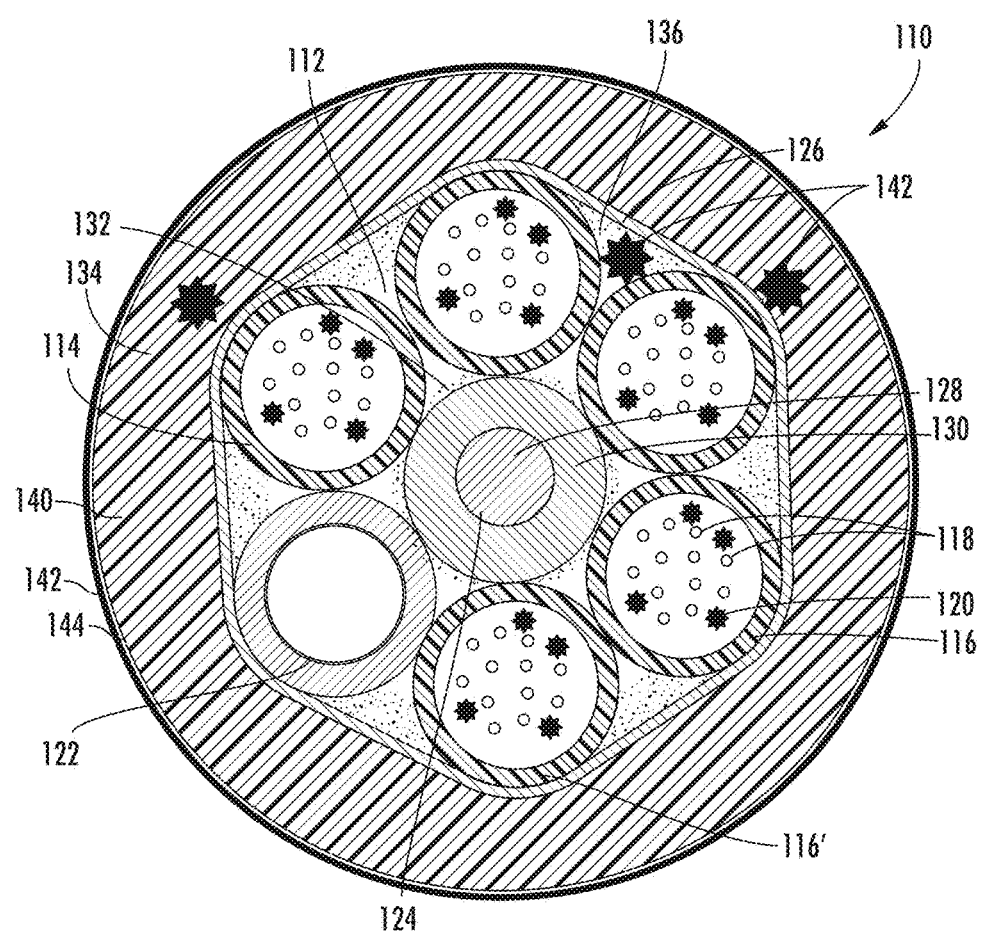
FIG. 1 is a cross-sectional view of a fiber optic cable in accordance with aspects of the present disclosure.

Referring to FIG. 1, a cable in the form of a fiber optic cable 110 may be an outside-plant loose tube cable, an indoor cable with fire-resistant/retardant properties, an indoor/outdoor cable, or another type of cable, such as a datacenter interconnect cable with micro-modules or a hybrid fiber optic cable including conductive elements. According to an exemplary embodiment, the cable 110 includes a core 112 (e.g., sub-assembly, micro-module), which may be located in the center of the cable 110 or elsewhere and may be the only core of the cable 110 or one of several cores. According to an exemplary embodiment, the core 112 of the cable 110 includes core elements 114.

In some embodiments, the core elements 114 include a tube 116, such as a buffer tube surrounding at least one optical fiber 118, a tight-buffer surrounding an optical fiber, or other tube. According to an exemplary embodiment, the tube 116 may contain two, four, six, twelve, twenty-four or other numbers of optical fibers 118. In contemplated embodiments, the core elements 114 additionally or alternatively include a tube 116 in the form of a dielectric insulator surrounding a conductive wire or wires, such as for a hybrid cable.

In some embodiments, the tube 116 further includes a water-blocking element, such as gel (e.g., grease, petroleum-based gel) or an absorbent polymer (e.g., super-absorbent polymer particles or powder). In some such embodiments, the tube 116 includes yarn 120 carrying (e.g., impregnated with) super-absorbent polymer, such as at least one water-blocking yarn 120, at least two such yarns, or at least four such yarns per tube 116. In other contemplated embodiments, the tube 116 includes super-absorbent polymer without a separate carrier, such as where the super-absorbent polymer is loose or attached to interior walls of the tube. In some such embodiments, particles of super-absorbent polymer are partially embedded in walls of the tube 116 (interior and/or exterior walls of the tube) or bonded thereto with an adhesive. For example, the particles of super-absorbent polymer may be pneumatically sprayed onto the tube 116 walls during extrusion of the tube 116 and embedded in the tube 116 while the tube 116 is tacky, such as from extrusion processes.

According to an exemplary embodiment, the optical fiber 118 of the tube 116 is a glass optical fiber, having a fiber optic core surrounded by a cladding (shown as a circle surrounding a dot in FIG. 1). Some such glass optical fibers may also include one or more polymeric coatings. The optical fiber 118 of the tube 116 is a single mode optical fiber in some embodiments, a multi-mode optical fiber in other embodiments, a multi-core optical fiber in still other embodiments. The optical fiber 118 may be bend resistant (e.g., bend insensitive optical fiber, such as CLEARCURVE™ optical fiber manufactured by Corning Incorporated of Corning, N.Y.) and/or may have various dimensional characteristics, such as fibers with 200 μm coating outer diameters, for example. The optical fiber 118 may be color-coated and/or tight-buffered. The optical fiber 118 may be one of several optical fibers aligned and bound together in a fiber ribbon form.

According to an exemplary embodiment, the core 112 of the cable 110 includes a plurality of additional core elements (e.g., elongate elements extending lengthwise through the cable 110), in addition to the tube 116, such as at least three additional core elements, at least five additional core elements. According to an exemplary embodiment, the plurality of additional core elements includes at least one of a filler rod 122 and/or an additional tube 116'. In other contemplated embodiments, the core elements 114 may also or alternatively include straight or stranded conductive wires (e.g., copper or aluminum wires) or other elements. In some embodiments, the core elements are all about the same size and cross-sectional shape (see FIG. 1), such as all being round and having diameters of within 10% of the diameter of the largest of the core elements 114. In other embodiments, core elements 114 may vary in size and/or shape.

Figure 2:
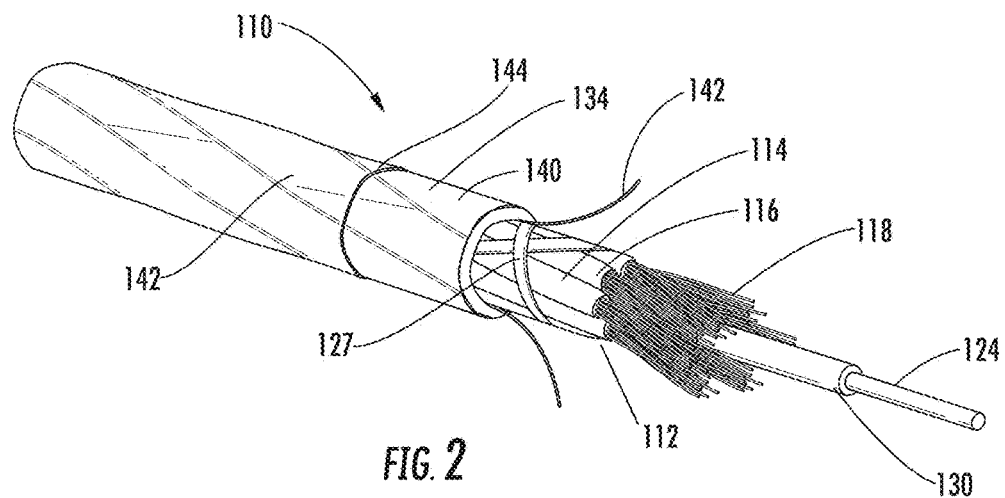
FIG. 2 is a perspective view of a fiber optic cable in accordance with aspects of the present disclosure.

Referring now to FIGS. 1-2, the cable 110 may include a film (e.g., membrane, sleeve), shown as a single-layered film 126 in FIG. 1 or a binder 127 (e.g., binder yarns, etc.) in FIG. 2, exterior to some or all of the core elements 114.

In some embodiments, the film may serve as a binder, where the tube 116 and the plurality of additional core elements 116', 122 are at least partially constrained (i.e., held in place) and directly or indirectly bound to one another by the film 126 or binder 127. In some embodiments, the film 126 or binder 127 may directly contact the core elements 114 to hold the core elements 114 against a central strength member 124 and/or one another.

In some embodiments, the single-layered film 126 or binder 127 may be formed from a base or substrate polymer, such as polyethylene, polypropylene, etc., and flame-retardant filler material mixed therein (e.g., fire-retardant, fire-resistant, fireproof, flame-resistant, etc. material). Examples of such filler material include as aluminum hydroxide (ATH), magnesium hydroxide (MDH), huntite and hydromagnesite, hydrates, red phosphorus, boron compounds such as borates, organohalogen compounds, and organophosphorus compounds.

Subsequent to the application of the film 126 or binder 127, for example, the manufacturing process further includes application of a jacket 134 to surround the core 112, thereby improving robustness and/or weather-ability of the cable 110 (see generally FIG. 1).

As shown in FIGS. 1 and 2, the cable 110 may further include the central strength member 124, which may be a dielectric strength member, such as an up-jacketed glass-reinforced composite rod. In other embodiments, the central strength member 124 may be or include a steel rod, stranded steel, tensile yarn or fibers (e.g., bundled aramid), or other strengthening materials. As shown in FIGS. 1 and 2, the central strength member 124 may include a center rod 128 and is up-jacketed with a polymeric material 130 (e.g., polyethylene with flame-retardant additive, polyvinyl chloride with flame-retardant additive, low-smoke zero-halogen polymer).

According to an exemplary embodiment, powder particles 132, such as (1) super-absorbent polymer and/or another powder (e.g., talc) or another water-absorbing component (e.g., water-blocking tape, water-blocking yarns), (2) particles of flame-retardant material, such as those flame-retardant materials disclosed herein, (3) solid lubricant powders, such as talcum powder, graphite, etc., and/or (4) particles of intumescent material, such as materials containing at least 10% hydrates by weight, at least 30% hydrates by weight, at least 50% hydrates by weight, sodium silicates, and/or graphite, may be attached to the outer surface of the central strength member 124. Combinations of such powder particles may be used together, such as intumescent and flame-retardant powder. Further, some such powder particles may serve multiple, synergistic purposes, such as graphite serving to form a hard char layer upon exposure to fire and also serving to control coupling (e.g., lower friction) between adjoining surfaces.

According to an exemplary embodiment, the intumescent particles may be formed from one or more intumescent materials that expands and forms char upon exposure to heat. The expansion of the intumescent material provides fire resistance by blocking air flow through cable jacket, such as through interstices formed between components in the core. In various embodiments, intumescent particles are configured to expand in volume more than 500 times their unexpanded volume in the presence of fire, and in other embodiments are configured to expand in volume more than 1000 times their unexpanded volume in the presence of fire. In addition, the char formation provides a layer material with low heat transfer characteristics. In various embodiments, intumescent particles may include intumescent materials that form light char and/or include intumescent materials that form hard char. In various embodiments, the intumescent material of particles include one or more of the Exolit materials commercially available from Clariant, such as Exolit AP 765 (TP) material, intumescent powders manufactured by CeaseFire, intumescent powders manufactured by Zhejiang Longyou Sihai Chemical Industry Co., Ltd., Qingdao Sungraf Chemical Industry Co., Ltd., Dalian CR Science Development Co., Ltd., Weifang Menjie Chemicals Co., Ltd., or other manufacturers. At least some of the powder particles 132 may be partially embedded in the up-jacket 130, and attached thereto by pneumatically spraying the particles 132 against the up jacket 130 while the up jacket 130 is in a tacky and/or softened state. The powder particles 132 may increase or otherwise affect coupling between the central strength member 124 and the core elements 114 around the central strength member 124.

According to an exemplary embodiment, the powder particles 132, 136 include super-absorbent polymer particles (e.g., sodium polyacrylate, ethylene maleic anhydride copolymer, polyacrylamide copolymer, polyvinyl alcohol copolymers, cross-linked polyethylene oxide, cross-linked carboxymethylcellulose, and starch-grafted copolymer of polyacrylonitrile) and the amount of super-absorbent polymer particles is less than 100 grams per square meter of surface area ($g/m^2$) of the respective component to which the powder particles are coupled (central strength member 124 or film 126). In some such embodiments, the amount of super-absorbent polymer particles is between 20 and 60 $g/m^2$, such as between 25 and 40 $g/m^2$. According to an exemplary embodiment, the amount of super-absorbent polymer or other water-blocking elements used in the cable is at least sufficient to block a one-meter pressure head of tap water in a one-meter length of the cable 110, according to industry standard water penetration tests, which may correspond to the above quantities, depending upon other characteristics of the respective cable 110, such as interstitial spacing between core elements 114.

Alternatively or in addition thereto, the particles 132 may be attached to the up-jacket 130 with an adhesive. In some embodiments, the central strength member 124 includes the rod 128 without an up-jacket, and the particles 132 may be attached to the rod 128. In contemplated embodiments, a strength member, such as a glass-reinforced rod or up-jacketed steel rod, includes particles 132 attached to the outer surface thereof, as disclosed above, without the strength member being a central strength member.

In some embodiments, the core elements 114 are stranded (i.e., wound) about the central strength member 124. The core elements 114 may be stranded in a repeating reverse-oscillatory pattern, such as so-called S-Z stranding or other stranding patterns (e.g., helical). In other contemplated embodiments, the core elements 114 may be non-stranded. In some such embodiments, the core elements 114 include micro-modules or tight-buffered optical fibers that are oriented generally in parallel with one another inside the core 112. For example, harness cables and/or interconnect cables may include a plurality of micro-modules, each including optical fibers and tensile yarn (e.g., aramid), where the micro-modules are bound together by the film 126 or binder 127. The aramid may be between the film 126 or binder 127 and the jacket 134, and/or the aramid may be inside the film 126 or binder 127, such as surrounding the stranded subunits (e.g., buffer tubes, tight-buffered fibers, micro-modules). Some such cables may not include a central strength member. Some embodiments, include multiple cores or sub-assemblies, each bound by a film 126 or binder 127, and jacketed together in the same carrier/distribution cable. The multiple cores or sub-assemblies may be bound together with yet another film. For some such embodiments, techniques disclosed herein for rapid cooling/solidification during extrusion and inducing radial tension in the film 126 for coupling to a central strength member 124 may be unnecessary for manufacturing. Features of the cable 110 can be mixed and matched in different combinations to form other cables according to the disclosure herein.

Referring again to FIG. 1, in some embodiments the film 126 of the cable 110 includes powder particles 136, which may be used for providing water blocking, retarding fire, choking off interstices (i.e., reducing the so called "chimney effect"), and/or for controlling coupling (e.g., decoupling) of adjoining surfaces in the cable 110. In some embodiments, the powder particles 132, 136 may have an average maximum cross-sectional dimension of 500 micrometers (μm) or less, such as 250 μm or less, 100 μm or less. The particles 132, 136 may be embedded in the film 126 or between the film 126 and the core elements 114 or in any of the interstitial spaces in the core, for example. In addition to blocking water, retarding fire, blocking interstices, etc., such placement may mitigate adhesion between certain core elements 114 during manufacturing of the cable 110.

According to an exemplary embodiment, embedded material discontinuities in the jacket (see generally features 142 of FIG. 1 for placement of such features), such as narrow strips of co-extruded polypropylene embedded in a polyethylene jacket 134, may provide tear paths to facilitate opening the jacket 134. Alternatively, ripcords 142 (FIG. 1) in or adjoining the jacket 134 may facilitate opening the jacket 134. The powder particles 136 may further facilitate stripping the jacket 134 from the core 112 by decoupling surfaces adjacent to the powder particles 136. As such, depending upon placement of the powder particles 136, the particles 136 may facilitate decoupling of the jacket 134 from the film 126 or binders 127, such as for the cable 110 shown in FIG. 1 where the jacket 134 and film 126 are adjoining (i.e., particles 136 placed between the jacket 134 and film 126), and/or may facilitate decoupling of the film 126 or binder 127 from the core elements 114 (i.e., particles 136 placed between the film 126 and core elements 114).

As shown in FIGS. 1 and 2, jacket 134 may be a multilayer jacket consisting of one or more highly filled LSZH or FR inner layer(s) 140 and an unfilled or lightly filled outer layer 142, such as polyethylene (PE). A bedding compound, which consists of a very highly filled polymer blend for maximum fire retardancy, may be the inner layer 140 of the multilayer jacket. Due to the required burn performance of the cable 110, the outer layer 142 is developed as a thinner layer in order to minimize the impact of the outer layer 142 on the fire test results. However, due to strain concentrations in the matrix material of the highly filled inner layer 140, the outer layer 142 must be sufficiently thick to prevent cracking in the outer layer from typical handling and installation loads placed on the cable 110. In accordance with aspects of the present disclosure, the thickness of the outer layer 142 may be 100 μm or less, which is sufficient to preclude cracking of the outer layer 142 while providing low surface friction for blowing performance. A sufficiently thin outer skin layer 142 (as thin as 100 μm or less) made with unfilled or lightly filled PE, or other such suitable material, has minimal effect on overall burn performance of the cable while providing low friction for enhanced blowing performance during installation and high ultimate elongation for crack resistance.

A coextrusion method may be used to manufacture the multiple layer jacket 134 in which the outer layer 142 may be a thinner layer. It is known that FR and LSZH materials provide superior fire properties; however, these materials do not necessarily provide low friction for blowing during installation or sufficient ultimate elongation to prevent cracking from handling and installation loads. The proposed outer layer 142, being made to have a low coefficient of friction improves the blowing performance and crack resistance of the cable. Coextrusion of the inner layer 140 and the outer layer 142 provides for very good adhesion between the jacket layers so that the layers will not separate during installation. Coextrusion also enables production of the jacket 134 in one step rather than a more expensive option of producing the cable using two separate steps.

Figure 3:
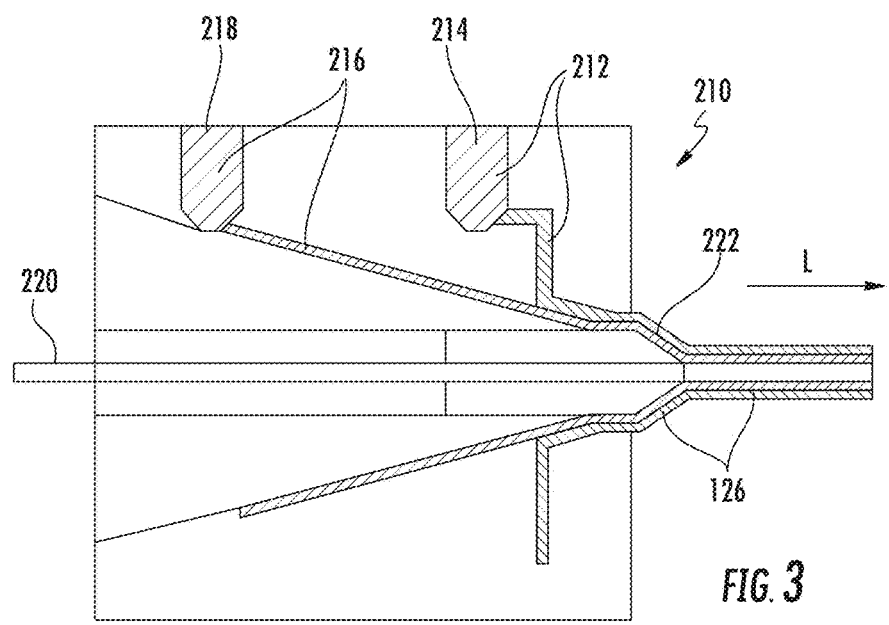
FIG. 3 is a side cross-sectional view of a multi-layer extrusion structure in accordance with aspects of the present disclosure.

Referring to FIG. 3, an extruder 210 (e.g., crosshead) includes a flow path 212 for a first extrudable polymer 214 of the outer layer 242 and a flow path 216 for a second extrudable polymer 218 making up the inner layer 240. Similar extruders may have additional such flow paths for third, fourth, fifth, etc., extrudable polymers. In FIG. 3, the first and second extrudable polymers 214, 218 may be co-extrudable with one another, meaning that the first and second extrudable polymers 214, 218 have a sufficiently close melting point (e.g., within 80° C., within 50° C.) and corresponding viscosity, among other parameters, that the first and second extrudable polymers 214, 218 are compatible for coextrusion. In some embodiments, the extrusion paths 212, 216 converge such that the first and second extrudable polymers 214, 218 are co-extruded in the extruder 210.

In other embodiments, the first and second extrudable polymers 214, 216 may be discretely extruded, such as in tandem by separate extruders on a manufacturing line or by multiple passes through the same extruder. According to an exemplary embodiment, the first and second extrudable polymers 214, 218 are extruded around the core elements 220 of the cable that pass through the extruder 210 and into the extrusion cone 222 of the first and second extrudable polymers 214, 218. The core elements 220 may include optical fibers and/or a tube or tubes surrounding optical fibers, among other elements. In some embodiments, the multilayer jacket 134 may then be rapidly cooled, such as in a water trough.

Figure 4:
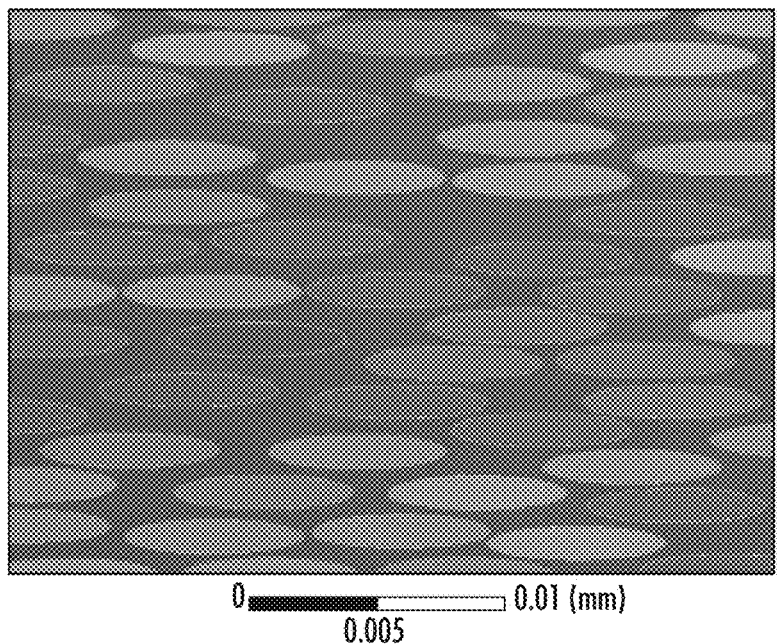
FIG. 4 is an illustration of a finite element model with 50% particle fill ratio based on volume, in accordance with aspects of the present disclosure.
Figure 5:
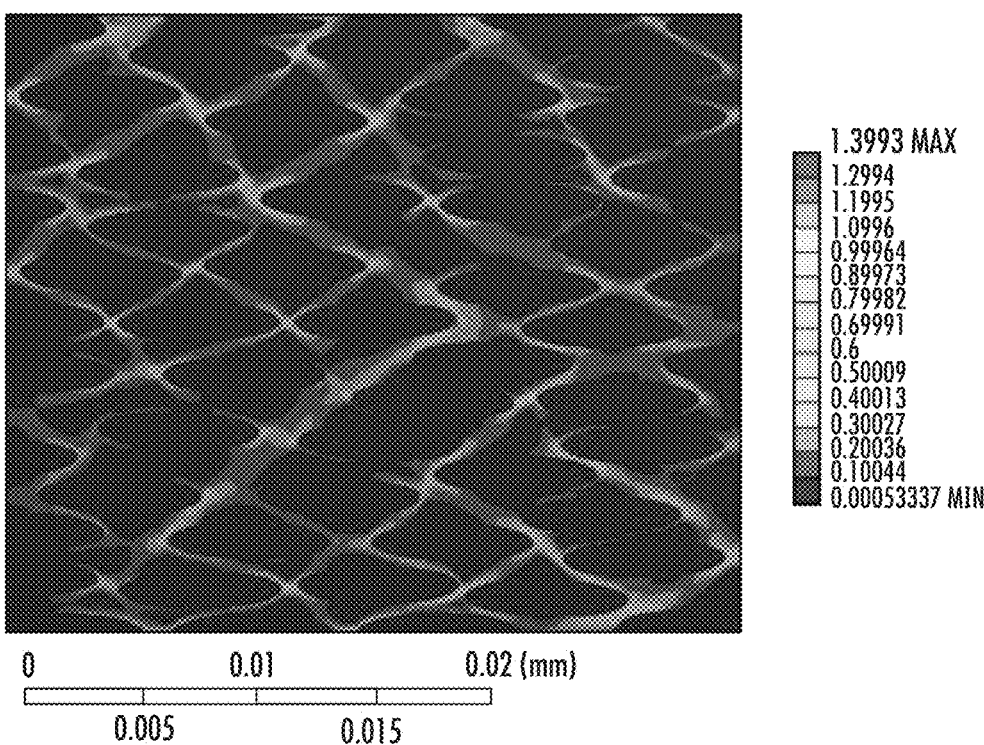
FIG. 5 is an illustration of a finite element contour strain plot showing strain concentration effects from fill particles with 0.05 strain applied in an x direction, in accordance with aspects of the present disclosure.

Strain concentrations as great as 28 (1.399/0.05=28) exist in a matrix material adjacent to filler particles for the filler particle loading shown in FIGS. 4 and 5. Use of an unfilled or lightly filled, high ultimate elongation material for outer layer 142 significantly reduces the strain concentrations in the outer layer 142, thereby making the cable 110 with a dual layer jacket 134 less sensitive to surface cracking. Complete decoupling (separation) of the inner layer 140 and the outer layer 142 fully decouples the strain concentrations in the inner layer 140 from the outer layer 142 which provides additional resistance to surface cracking in the outer layer 142. In addition, bonding between the inner layer 140 and the outer layer 142 reduces wrinkling of the thin outer layer 142 during installation. An optimal thickness of the outer layer 142 and the bond between the outer layer 142 and the inner layer 140 is necessary to provide sufficient surface crack resistance while maintaining wrinkling resistance.

In accordance with aspects of the present disclosure, the cable 110 shown in FIGS. 1-2, has excellent adhesion at an interface 144 between the inner layer 140 and the outer layer 142, as demonstrated by the abrasion resistance of optical fiber cable sheaths test, Method E2A, acc. IEC 60794-1-2. Adhesion allows two layers to act as one jacket while each layer provides complementary properties. Inner layer 140 must be fire resistant with a nominal thickness of 1.05 mm. The outer layer 142, which may also be defined as a skin layer, for example, having a nominal thickness of 100 μm or less, must be strong enough to withstand the blowing installation process while having a coefficient of friction that is as low as possible to enhance the same blowing process.

In accordance with aspects of the present disclosure, the cable jacket 134 may have an inner layer 140 that includes a flame retardant non-corrosive (FRNC) material and an outer layer 142 that uses a non-FRNC material. A high density material may be used for the outer layer 142 so that the mechanical properties of the material are superior to other conventional FRNC and non-FRNC materials.

Coextrusion of the dual layer jacket 134 provides strong adhesion between the layers 140 and 142. Moreover, the thinness of the outer layer 142 and the choice of a natural material for the outer layer 142 may make the outer layer 142 virtually invisible to field personnel while providing increased blowing performance. By having an outer layer 142 with a nominal thickness of 100 μm or less, even if comprised of a non-FRNC material, the impact of the outer layer 142 on the fire performance of the cable 110 may be reduced. For example, based on the single cable burn test acc. IEC 60332-1-2, it was observed that using very thin non-FRNC material as the outer layer 142 has a negible impact on the fire performance test results.

Exemplary materials for use in the inner layer 140 include low smoke and fume FR non-halogen sheathing compounds, such as ECCOH™ 5549/1. These materials provide the cables in accordance with aspects of the present disclosure a very high fire test performance, and combining excellent flame retardant properties due to high char forming with good processing and enhanced mechanical and thermal characteristics. MEGOLON® S540 is a thermoplastic, halogen free cable sheathing compound which exhibits an excellent level of fire retardancy. This product is specifically aimed at designs of cables requiring a good degree of flexibility and the ability to meet the more stringent fire test specifications. CONGuard S 6650 S LDD UV is a thermoplastic, halogen free, fire retardant, low smoke and fume cable compound, designed to meet premium requirements on fire retardancy enabling cables in accordance with aspects of the present disclosure to meet the more stringent fire specifications as well as maintain a high degree of flexibility. The product contains a chemical UV protection agent as well as our Low Die Drool (LDD) package for faster extrusion and low die drool.

Exemplary materials for use in the outer layer 142 include a natural, UV-stabilized, colorable, bimodal high density (HD) jacketing compound, such as HE6068, which is produced with a bimodal process technology. The technology in this type of material allows the manufacturing of polymers outside the traditional MFR and density range making it possible to optimize processability, reduce shrinkage while providing durability and environmental stress crack resistance (ESCR). HE6068 contains a well dispersed UV-stabilizer in sufficient amount to provide a measure of weathering resistance. HE6068 offers substantially reduced shrinkage of the outer layer 142 which helps to maintain low signal attenuation for optical fiber communication cables and low jacket retraction while providing the mechanical and barrier properties desired.

The construction and arrangements of the cables, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments, cables include multiple layers or levels of core elements stranded around a central strength member 124, where each layer includes a film 126 constraining the respective layer and where film 126 of the outer layer(s) indirectly surrounds the film 126 of the inner layer(s). In contemplated embodiments, the film 126 is not extruded, but is formed from laser-welded tape and/or a heat shrink material, for example. Some elements shown as integrally formed may be constructed of multiple parts or elements, the position of elements may be reversed or otherwise varied, and the nature or number of discrete elements or positions may be altered or varied. In some contemplated embodiments, the film 126 with water-blocking powder, as disclosed herein, may function as an extruded water-blocking element, thereby allowing for continuous cable manufacturing without replacing reels of the water-blocking tape; which, for example, may block water between armor (or other outer layers in a cable) and a core 112, such as a core of stacked fiber optic ribbons or a mono-tube core, or between other components in a cable. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   (A) a core subassembly comprising at least the following core elements:
      (i) at least one optical fiber;
      (ii) a tube surrounding the optical fiber; and
      (iii) at least one additional tube surrounding another optical fiber;
   (B) a jacket surrounding the core subassembly, wherein the jacket comprises:
      (i) an inner layer comprising a flame retardant (FR) material; and
      (ii) an outer layer comprising a non flame retardant material having a lower coefficient of friction than the flame retardant material; and
   (C) a central strength member, wherein the core elements are stranded around the central strength member in a pattern of stranding including reversals in a lay direction of the core elements.

2. The fiber optic cable of claim 1, wherein an average thickness of the outer layer is equal to or less than 100 microns.

3. The fiber optic cable of claim 1, wherein the flame retardant material of the inner layer is a low smoke zero halogen (LSZH) material comprising a filler material.

4. The fiber optic cable of claim 3, wherein the filler material comprises magnesium hydroxide or aluminum hydroxide.

5. The fiber optic cable of claim 1, wherein the multi-layered jacket is a co-extruded multilayer jacket, the inner layer and the outer layer having sufficient bond strength to prevent wrinkling of the outer layer during installation.

6. The fiber optic cable of claim 1, wherein the non flame retardant material of the outer layer comprises a polyethylene material.

7. The fiber optic cable of claim 1, further comprising a thin film structure surrounding the core subassembly.

8. The fiber optic cable of claim 7, wherein the thin film structure is a multi-layered flame-retardant film structure.

9. The fiber optic cable of claim 7, wherein the thin film structure directly contacts the jacket.

10. A method of manufacturing an optical fiber cable comprising:
    providing a core subassembly comprising core elements that include a plurality of tubes stranded around a central strength member in a pattern of stranding including reversals in a lay direction of the core elements; and
    co-extruding a multi-layered jacket around the core subassembly, wherein the multi-layered jacket includes an inner layer comprising a flame retardant (FR) material and an outer layer comprising a non flame retardant material having a lower coefficient of friction than the flame retardant material.

11. The method claim 10, wherein the core subassembly comprises at least one optical fiber and a tube surrounding the optical fiber.

12. The method of claim 10, wherein the step of co-extruding the inner layer and the outer layer forms a bond of sufficient strength between the inner layer and the outer layer to prevent wrinkling of the outer layer during installation.

13. The fiber optic cable of claim 10, wherein a thickness of the outer layer is equal to or less than 100 microns.

14. A fiber optic cable, comprising:
    a core subassembly comprising a tube surrounding at least one optical fiber;
    a jacket surrounding the core subassembly, wherein the jacket comprises an inner layer comprising a flame retardant (FR) material and an outer layer comprising a non flame retardant material having a lower coefficient of friction than the flame retardant material; and
    a thin film structure surrounding the core subassembly.

15. The fiber optic cable of claim 14, wherein an average thickness of the outer layer is equal to or less than 100 microns.

16. The fiber optic cable of claim 14, wherein the flame retardant material of the inner layer is a low smoke zero halogen (LSZH) material comprising a filler material.

17. The fiber optic cable of claim 16, wherein the filler material comprises magnesium hydroxide or aluminum hydroxide.

18. The fiber optic cable of claim 14, wherein the multi-layered jacket is a co-extruded multilayer jacket, the inner layer and the outer layer having sufficient bond strength to prevent wrinkling of the outer layer during installation.

19. The fiber optic cable of claim 14, wherein the non flame retardant material of the outer layer comprises a polyethylene material.

20. The fiber optic cable of claim 14, wherein the thin film structure is a multi-layered flame-retardant film structure.

21. The fiber optic cable of claim 14, wherein the thin film structure directly contacts the jacket.

* * * * *